Nov. 24, 1925.
A. H. PAPE
1,563,287
AUTOMOBILE TOP
Filed Feb. 16, 1921     3 Sheets-Sheet 1
FIG. 1
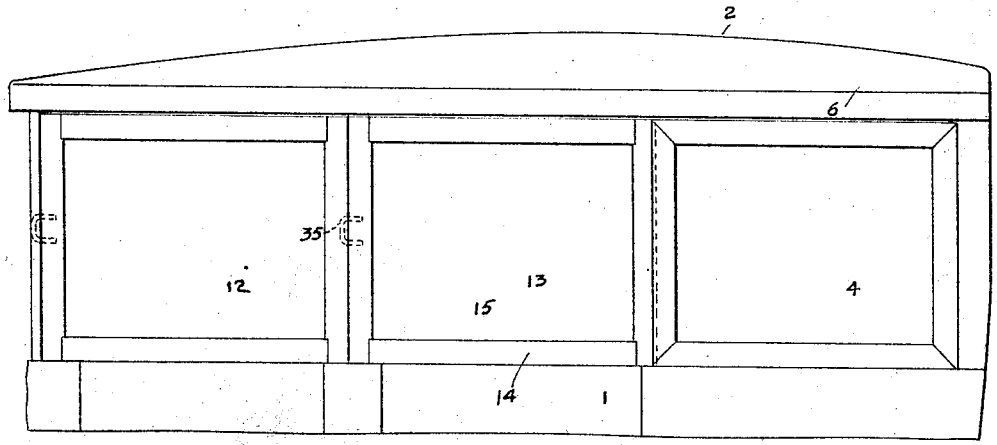
FIG. 2
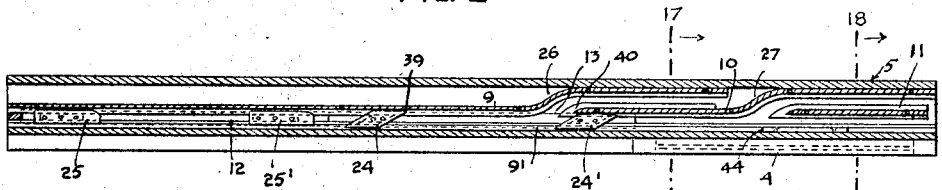
FIG. 3
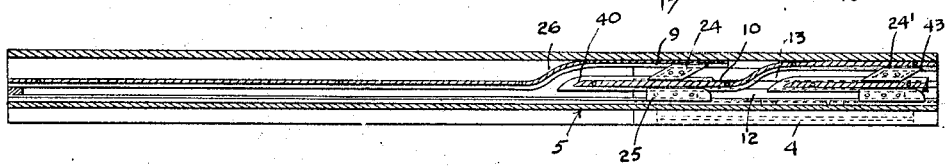
FIG. 4
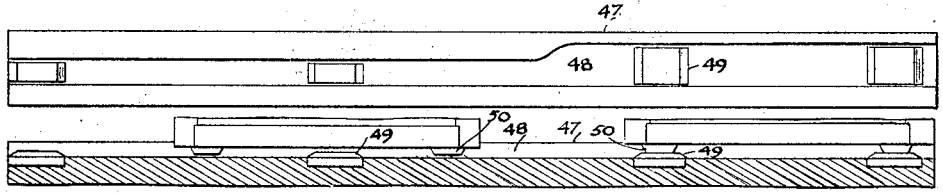
FIG. 5
FIG. 6
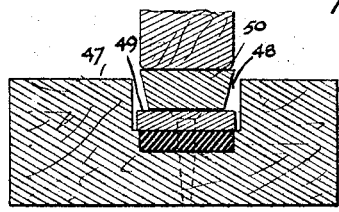
INVENTOR.
A. H. PAPE
BY *Wright & Chinn*
ATTORNEYS.

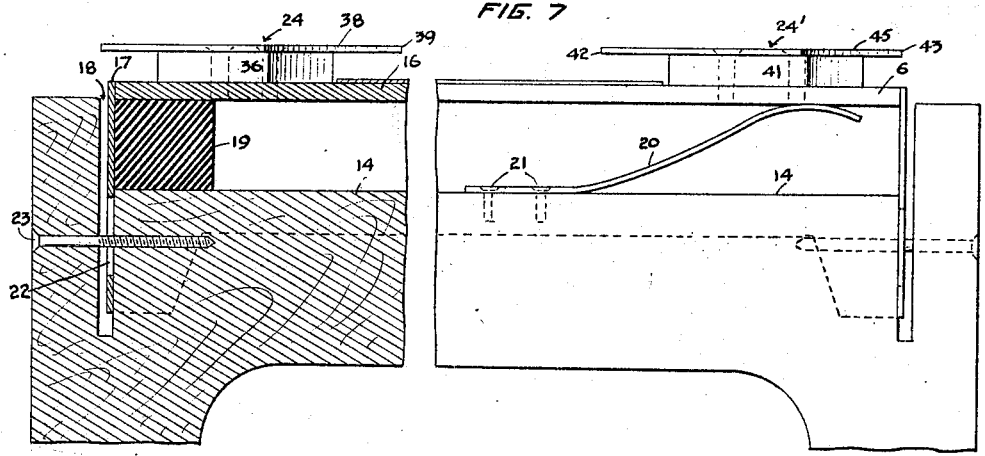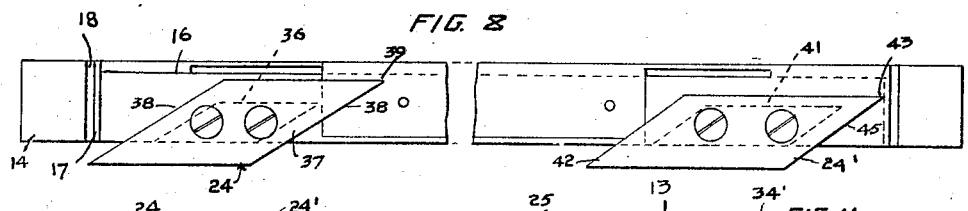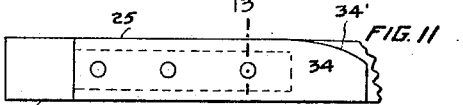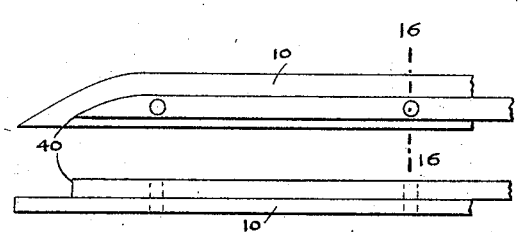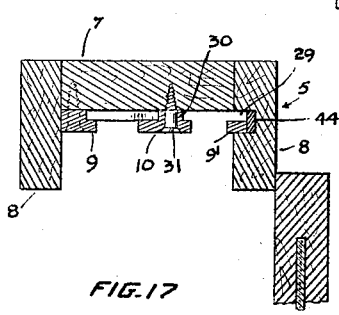

Nov. 24, 1925.                         1,563,287
A. H. PAPE
AUTOMOBILE TOP
Filed Feb. 16, 1921          3 Sheets-Sheet 3

INVENTOR
A. H. PAPE
BY
ATT'YS.

Patented Nov. 24, 1925.

1,563,287

UNITED STATES PATENT OFFICE.

AUGUST H. PAPE, OF KENTFIELD, CALIFORNIA.

AUTOMOBILE TOP.

Application filed February 16, 1921. Serial No. 445,326.

*To all whom it may concern:*

Be it known that I, AUGUST H. PAPE, a citizen of the United States, residing at Kentfield, in the county of Marin and State of California, have invented new and useful Improvements in Automobile Tops, of which the following is a specification.

This invention relates to automobile tops and more particularly to improvements in the construction arrangement and mode of operation of side windows for such tops.

The primary object of the invention is to simplify the construction and mode of operation of sliding side windows for automobiles whereby the said windows may be more easily and cheaply installed, may be made at a relatively lower cost, will take up less room, be prevented from rattling and will present a neater and more finished appearance than windows such as heretofore used, it being possible to install the windows of the invention without making any material changes in the construction of the automobile top and body.

Another object is to provide automobile window construction of the character described in which there is provided a plurality of sliding sashes arranged so that little or no effort is required of the operator to move first one and then another sash into or out of closed position, said sashes being in line rather than overlapped at their edges when extended and when in out-of-the way position lying side by side in the rear portion of the automobile top, there being provided means whereby when each sash is pulled into out-of-the way position said sash will automatically move into the proper position whereby the sashes may be housed in small compass.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawings:

Figure 1 is a longitudinal sectional view taken through an automobile top showing my invention as it will appear when in use in side elevation and also showing in side elevation a part of the body of the automobile.

Figure 2 is a longitudinal sectional view taken on the line 2—2 of Figure 1, showing the window extended.

Figure 3 is a sectional view showing the windows in out-of-the way position.

Figure 4 is a top plan view of the upper edge of the automobile body showing certain parts of the invention applied thereto.

Figure 5 is a longitudinal fragmentary vertical sectional view taken along the upper edge of the body showing portions of the windows in extended and partly extended position with relation thereto.

Figure 6 is an enlarged sectional view taken on the line 6—6 of Figure 5.

Figure 7 is an enlarged cross sectional view taken through the upper part of the window or sash frame, shown partly in elevation.

Figure 8 is a top plan view of one of the sashes.

Figures 9 and 10 are detail elevation views of the front and rear shoes.

Figure 11 is a top plan view of one of the shoes.

Figure 12 is a side elevation of the shoe shown in Figure 11.

Figure 13 is a sectional view taken on line 13—13 of Figure 11.

Figure 14 is a bottom plan view of one of the shoes.

Figure 15 is a side elevation of the shoe shown in Figure 14.

Figure 16 is a cross sectional view taken on line 16—16 of Figure 14.

Figure 17 is a cross sectional view enlarged, taken on line 17—17 of Figure 2, and showing in dotted lines the relation of the track to the automobile top.

Figure 18:
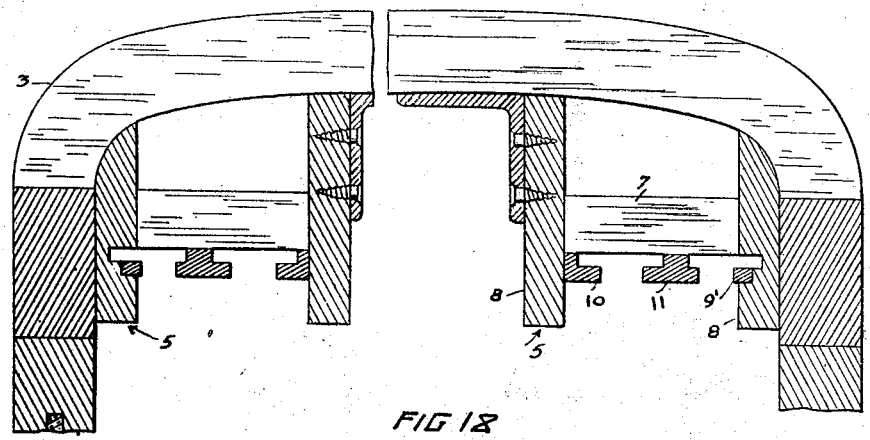
Figure 18 is a sectional view taken on line 18—18 of Figure 2.

Referring to the drawings 1 designates the body of an automobile having a top 2 of the ordinary construction provided with the usual bows 3, there being stationary side windows or sashes 4 secured to the body 1 and top at the rear end of the automobile so as to adapt the same for the application of the side windows of my invention.

In carrying out my invention I provide upon each side of the top a guide or support 5 which is secured in any suitable manner to the bows 3 and arranged so as to be concealed by the overhanging portions 6 of the top. These supports or guides extend from the rear to the front end of the top, being box-like and open at their under sides so as to serve as a foundation for the attachment of the apparatus of this invention to the automobile.

Each guide or support 5 comprises a flat preferably rectilinear board or plate 7 having depending edge flanges 8 and carrying upon its under side a plurality of tracks 9, 9', 10 and 11. The upper edges of stationary windows 4 terminate in close proximity to the outer longitudinal edges of the supports 5 and may if desired be attached thereto, this relation being shown in Figure 17.

Mounted within and supported by each member 5 so as to be slidable into and out of position are front and rear sashes 12 and 13 respectively, each of which comprises a frame 14 and the usual glass pane 15.

Carried by each sash frame is means for slidably connecting the frame with the supporting means 5 therefor. This means comprises a straight angular bar or plate 16 provided with channel shaped depending end portions 17. The bar extends above and parallel to the horizontal upper portion of the sash frame and the channel shaped end portions 17 extend into vertical slots 18 formed in the sash frame.

Interposed between the bar 16 and the upper edge of the sash frame are resilient members which may consist of blocks 19 of compressible resilient substance such as rubber or be in the form of leaf springs as shown at 20, both in Figure 7. In the case of blocks the same will be fitted into the channel portions 17 and engage with the bar 16 and upper edge of sash frame. In case of leaf springs the springs will be secured as at 21 to the upper side of the sash frame and extended so as to engage, under tension, the bar 6. The object employing such resilient means is to prevent rattling of the sashes and insure the close engagement thereof with the upper edge of the automobile body, when the sashes are extended. The bar 16 and sash frame are relatively vertically movable, there being provided slots 22 in the portions 17 for screws 23, carried by said sash frame. The upper sides of the bars 6 carry adjacent opposite ends thereof shoes 24, 24' for the rear sash and shoes 25 and 25' for the front sash, both sets of which, cooperate with tracks 9, 9', 10 and 11.

The tracks 9, 9', 10 and 11 and track shoes are of such construction and relative arrangement that when the sashes are extended as shown in Figure 2 of the drawing, said sashes will be in alinement and present a neat appearance at the sides of the automobile. The construction and arrangement of these parts is also such that in moving the sashes to out-of-the way position, the rear sash will lie in the inside position shown in Figure 3 and the front sash will assume position parallel thereto between the rear sash and stationary sash 4, it only being necessary to push the rear sash back into out-of-the way position and then the front sash, the parallel, side-by-side positioning of said sashes taking place automatically.

The track 9 extends from the front end of each support 5 rearwardly in a straight line to a point a short distance in advance of the front edge of the window 4 along one side of the frame or support 5 and then curves and extends inwardly and rearwardly as at 26 and again extends rearwardly in a straight line to a point rearwardly of the front edge of the stationary window approximately the same distance that the portion 26 is spaced forwardly from said window. The track 9' extends the full length of the support 5 along the side thereof opposite to the track 9. The track 10 extends from a point slightly rearwardly of the point 26 of the track 9, in a straight line to a point opposite the rear extremity of the track 9 being T shaped at the forward end for about six inches, then extends inwardly and rearwardly in a curved portion 27 and then to the rear of the frame from the curved point in a straight line. The track 11 is a short straight T shaped track extending from a point just rearward of the curve portion 27 of the track 10, to the rear of the guide 5. The track 9 is in the form of angle iron strip and is secured to the innermost flange 8 so as to abut the under side of the board 7 and one portion thereof is disposed horizontally in spaced relation to said board 7 whereby the necessary support or track surface is provided. The track 9' is secured in a longitudinal recess therefor formed in the inner side of a longitudinal groove 29 provided in the inner faces of one of the flanges 8. This track is in the form of a flat elongated strip. of rectilinear outline in cross section, and is secured so as to project outwardly from the vertical inner side of said flange 8 in the same horizontal plane with the track 9. The track 10 is, for the most part, substantially T shaped in cross section, having the stem portion 30, its T shaped portion, secured by suitable means 31 to the under face of the board 7. The rearmost portion of the track 10 is extended along the side face of the inner flange 8 and is substantially L shaped in cross section since it is only necessary at this point to provide a single supporting or track portion. The track 11 is T shaped, provided with a double supporting surface for its entire length and is secured to the board 7 in the same manner as is the track 10.

The front window slides upon the tracks 9, 9', 10 and 11 between the tracks 9' and the tracks 9, 10 and 11 and its shoes 25 and 25' (see Figs. 11 and 12) comprise vertical portions 33 fastened to the upper edge of the window, and laterally disposed positions 34 carried by the portions 33 and arranged to engage upon the upper sides of said tracks. The portions 33 clear the tracks and slide freely therebetween. The window moves forwardly and rearwardly in the same plane, that is, in a straight line, the shoes 25 and 25' being longer than the shoes 24 and 24' for the rear window and narrower whereby they will not be subject to switching from off the track 9' to position between the tracks 9 and 10 and between the tracks 10 and 11. The rear ends of these shoes are rounded as at 34" so as to avoid being switched off of the track 9'. A suitable handle 35 is provided for each window.

The shoes 24 and 24' for the rear sash or window and the tracks are of such construction that in moving the window from extended to out-of-the way position, they will move off of the track 9' onto the other tracks simultaneously whereby the window is bodily moved outwardly to one side its position of alinement with the front window. Thus the rear window moves out-of-the way of the front window and the front window is drawn straight back to a position directly opposite and alongside the rear window. In extending the rear window it moves, by reason of the track and shoe construction, into position of alinement with the front window. The shoe 24 is in front and the shoe 24' the rear. The front shoe 24 is designed to switch off of and from between the tracks 9' and 9 when it encounters the front end of the track 10 and engages the curved portion 26 of the track 9 and the tracks 9 and 10. The rear shoe 24' is constructed so as to pass from between the tracks 9' and 10 onto and between the tracks 10 and 11, instead of switching onto the other side of track 10 between tracks 9 and 10. However, when the rear shoe 24' arrives at the part 27 of the track 19 and at the front end of the track 11, it is deflected by the switch plate 44 (see Fig. 17) and switches off of the track 9' onto and between the tracks 10 and 11. This takes place when the front shoe switches onto and between the tracks 9 and 10 as before described, whereby the rear window moves rearward and outward to one side of the track 9' and is out of the way of the front window. The front shoe 24 comprises a vertical narrow portion 36 on a flat thin plate 37 secured in horizontal position upon said portion 36 so as to extend laterally from opposite sides and from the ends of said portion. The side edges of the plate 37 are straight and parallel to the side edges of the window and the end edges 38 are inclined, cut on an obtuse angle, to the side edge and are parallel to one another. This arrangement provides a point 39 at the forward end of the plate which point is so disposed that when the rear window or sash is moved rearwardly the point 39 will encounter the forward beveled end 40 of the upright portion of the track 10 and by reason of the edge 39 will move off of the track 9' and onto and between the tracks 9 and 10.

The rear shoe 24' comprises a vertical thin portion 41 and a flat thin plate 42 with beveled end, secured to the portion 41 so as to extend laterally from opposite sides and ends of said portion. The plate 42 is mounted so that the pointed end 43 thereof will clear the end 40 of the track 10 and the rear shoe will continue past this pointed end. A switch plate or member 44 is mounted in the groove 29 for the track 9' so as to engage the beveled edge 45 of the shoe 24' when the shoe is opposite the portion 27 of the track 10. This will switch the rear shoe off of the track 9' onto and between the tracks 10 and 11. The switch member does not entirely obstruct the track 9' but extends outwardly sufficiently to encounter the beveled edge 45 as hereinbefore noted, the shoe 25' for the front window being constructed and arranged so that it will clear the switch member 44 when the front window is moved into and out of position.

Mounted in a weather strip 47 which is secured along the upper edges of the sides of the automobile body, in grooves 48 formed in said strips, are wedge members 49 which may be formed of brass or aluminum or other material as desired. The lower edges of the front and rear sashes operate in the grooves 48 and have similar wedge members 50 of wood fastened to frames therefor. The wedge members 49 and 50 are positioned so that they encounter one another at points slightly in advance of the full extended positions of both sashes. The ends of these members are beveled and when they engage one another the wedges 50 ride upon the wedges 49. The window or sashes will thus be firmly wedged and held in place when extended, whereby rattling of the parts of the apparatus is prevented. When moved off of the wedges 49, the wedges 50 clear the strips 47 and the windows may be easily moved back and forth. Said wedges 49 can be made with rubber base, said rubber being set into the wood allowing the plate to be pressed down. This also helps to hold the window still firmer.

To extend the windows or sashes from position shown in Figure 3, the front window is grasped by the handle at the forward edge thereof and pulled in straight alinement into the position shown in Figures 1 and 2. The rear window is then grasped in a similar manner and moved forwardly. As this window moves forwardly its shoes encounter the inwardly and forwardly turned portions 26 and 27 of the tracks 9 and 10 respectively, and moves inwardly and forwardly into position of alinement of the front window. This window is moved into position shown in Figure 2 and will lie flush with the front sash. Thus, it will be seen that the windows may be easily moved into extended position so as to lie in direct alinement with one another.

To move the windows or sashes into out-of-the way position the rear window is moved rearwardly and when the shoes 24 and 24' reach the points opposite the portions 26 and 27 of the tracks 9 and 10, the rear shoe 24' is switched over onto and between the tracks 10 and 11 by encountering the switch member 44 and the front shoe 24 is likewise switched over onto and between the tracks 9 and 10 by reason of the engagement of the point 39 of said shoe with the beveled end 40 of the track 10. This disposes the rear window out of alinement with the front window and the front window is then drawn to its rearmost position so as to lie opposite and between the rear window and stationary window, as shown in Figure 3.

Figure 19:
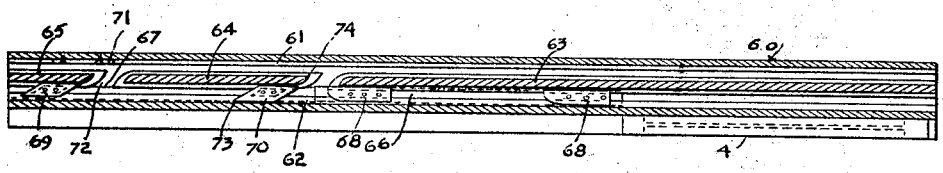
Figure 19 is a transverse sectional view taken through the top of the automobile showing the manner of mounting to tracks, the top being broken in two.
Figure 20:
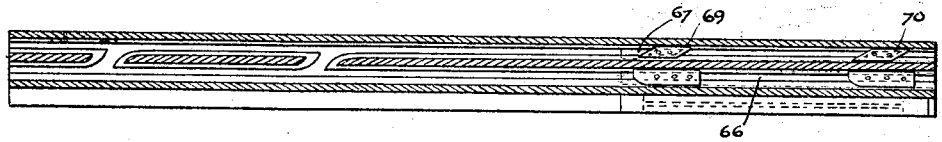
Figure 20 is a longitudinal horizontal sectional view looking downwardly upon the tracks of a modified form of the invention.

Referring to the modified form of the invention shown in Figures 19 and 20 the arrangement is practically the same as in the preferred form of the invention except that there are provided double tracks extending the entire length of the top instead of a single track as in the preferred form. This form is provided with the frame or housing 60 constructed identically with the one 5 in the preferred form of the invention, and mounted upon each side of the automobile top in a similar manner. Carried by each of these members 60 on opposite sides thereof are straight tracks 61 and 62 each extending the full length of the member 60. Depending from the top of the member 60 and disposed midway between the track 61 and 62 are alined tracks 63, 64 and 65 of which the track 63 is the longest and the track 64 is next in length. These tracks 63, 64 and 65 are spaced from one another at opposed ends so as to provide connecting channels between the tracks 61 and 62 whereby the window shoes may be switched from one of said first-named tracks to the other. There is provided a rear window 66 and a front window 67. The rear window 66 is provided with shoes 68 which are slidably mounted upon and between the tracks 62 and 63. The front window 67 is provided with shoes 69 and 70 at its forward and rear ends on the upper side thereof. These shoes when the window is extended rides upon and lie between the track 62 and the tracks 65 and 64 respectively, and when the front window is moved into out-of-the way position ride upon and lie between the track 60 and 63.

To move the windows into extended position the rear window 67 is moved or brought into position by being moved forwardly along and between the tracks 60 and 63. If desired the rear window 66 may be moved into its proper position first.

When the front shoe 69 and the rear window reaches a point substantially opposite the rear end of the track 65 it encounters a switch member 71 mounted upon the track 60 and is caused to move off of the track 60 through the channel 72 and onto and between the tracks 65 and 62. At the same time the forward end 73 of the rear shoe 70 encounters the pointed rear end 74 of the track 64 in such a way as to switch said shoe from the track 63 onto and between the track 62 and 64 as shown in Figure 19. Thus, it will be seen that the shoes on the rear window simultaneously switch from the track 61 to the track 62 so as to bring the front window into and out of alinement with the rear window. The front window is moved back into position shown in Figure 20 in the same manner as in moving said window forwardly.

The shoe 69 is constructed and arranged so as to avoid being switched by the end 74 of the track 64, this construction being similar as provided in the preferred form of the invention.

Figure 21:
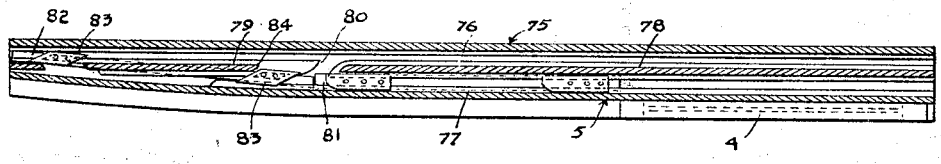
Figure 21 is a view similar to Figure 20 showing the windows extended.

As shown in Figure 21 the modified form of the invention is practically the same as illustrated in Figures 19 and 20 except that provision is made for an inward and forward disposal of the forward window so as to provide for conformity with the stream line of the body of the automobile. In carrying out this form there is provided the housing 75 corresponding to the one 60. In this housing is provided tracks 76 and 77 extending the full length of the housing and between these tracks are mounted track sections 78 and 79, between which connecting channel 80 is provided. The side frame or housing 75 is curved inwardly to its forward end and the track 77 is likewise curved. There is provided a rear window or sash 81 and a front sash 82. One of the shoes 83 for the front window, is at the forward edge of the window on the upper side thereof and is constructed so as to continue to ride upon the track 75 until the front window reaches its fully extended position. The rear shoe 83 is constructed so as to engage the pointed end 84 of the track 79 so as to cause said shoe to be switched from the track 76 onto and between the tracks 77 and 79 as shown in the drawings. This brings the rear edge of the front window into alinement with the rear edge of the front window while the front window is inclined forwardly and inwardly.

I claim:—

1. In combination with an automobile body and top therefor, a stationary window track mounted upon each side of the top and extending the full length thereof, other stationary window tracks to one side of the first-named track, a front window slidable upon the first-named track and movable thereon from one end thereof to the other end thereof, a rear window and means of connection between the rear window and said tracks including a stationary switch member for causing said rear window to be moved onto the said second named tracks when moved from extended to out-of-the way position.

2. In combination with an automobile body and a top therefor, a track support mounted upon said top, tracks carried by said support, windows, bars extending along the upper side of said windows, means of sliding connection between said bars and windows, shoes carried by said bars and being slidable upon said tracks, and means carried upon the upper edges of the body for engagement with the under side of the windows so as to lift said windows upwardly when the latter are moved into extended positions.

AUGUST H. PAPE.